(12) United States Patent
Moore et al.

(10) Patent No.: US 10,434,711 B2
(45) Date of Patent: Oct. 8, 2019

(54) BEARING BASED LEVELING ASSEMBLY FOR THREE-DIMENSIONAL OBJECT PRINTING

(71) Applicant: Xerox Corporation, Norwalk, CT (US)

(72) Inventors: Aaron M. Moore, Fairport, NY (US); Ron E. Dufort, Rochester, NY (US); Timothy G. Shelhart, West Henrietta, NY (US); Timothy D. Slattery, Elma, NY (US)

(73) Assignee: Xerox Corporation, Norwalk, CT (US)

(*) Notice: Subject to any disclaimer, the term of this patent is extended or adjusted under 35 U.S.C. 154(b) by 671 days.

(21) Appl. No.: 15/154,220

(22) Filed: May 13, 2016

(65) Prior Publication Data
US 2017/0326801 A1     Nov. 16, 2017

(51) Int. Cl.
| | | |
|---|---|---|
| *B29C 64/188* | (2017.01) | |
| *B33Y 30/00* | (2015.01) | |
| *B29C 64/307* | (2017.01) | |
| *B29C 65/30* | (2006.01) | |
| *B29C 64/40* | (2017.01) | |
| *B29C 64/30* | (2017.01) | |
| *B33Y 10/00* | (2015.01) | |
| *B29C 64/393* | (2017.01) | |
| *B33Y 40/00* | (2015.01) | |

(52) U.S. Cl.
CPC ............ *B29C 64/188* (2017.08); *B29C 64/30* (2017.08); *B29C 64/307* (2017.08); *B29C 64/393* (2017.08); *B29C 64/40* (2017.08); *B29C 65/30* (2013.01); *B33Y 10/00* (2014.12); *B33Y 30/00* (2014.12); *B33Y 40/00* (2014.12)

(58) Field of Classification Search
CPC ... B29C 64/188; B29C 64/307; B29C 64/393; B29C 64/40; B29C 64/30; B29C 65/30; B33Y 10/00; B33Y 30/00
See application file for complete search history.

(56) References Cited

U.S. PATENT DOCUMENTS

| | | | |
|---|---|---|---|
| 5,044,917 A * | 9/1991 | Hayashi | A21C 3/02 425/373 |
| 6,169,605 B1 * | 1/2001 | Penn | B33Y 50/00 358/1.1 |
| 7,209,797 B2 | 4/2007 | Kritchman et al. | |
| 2005/0104241 A1 | 5/2005 | Kirtchman et al. | |
| 2015/0266241 A1 | 9/2015 | Batchelder | |
| 2015/0266242 A1 | 9/2015 | Comb et al. | |
| 2015/0367415 A1 | 12/2015 | Buller et al. | |

* cited by examiner

*Primary Examiner* — Timothy Kennedy
*Assistant Examiner* — John Robitaille
(74) *Attorney, Agent, or Firm* — Maginot Moore & Beck LLP

(57) ABSTRACT

A three-dimensional object printer comprises a conveyor having a surface configured to convey a three-dimensional object in a first direction; and a leveling assembly configured to level a surface of the three-dimensional object as the conveyer conveys the three-dimensional object in the first direction, the leveling assembly comprising (i) a roller having a cylindrical shape, the roller having an outer surface that moves upon the surface of the three-dimensional object to level the surface of the three-dimensional object; and (ii) a guide device arranged between the roller and the planar surface of the conveyer, the device being configured to mechanically interact with the roller to maintain a constant distance between the outer surface of the roller and the planar surface of the conveyer.

6 Claims, 8 Drawing Sheets

US 10,434,711 B2

BEARING BASED LEVELING ASSEMBLY FOR THREE-DIMENSIONAL OBJECT PRINTING

TECHNICAL FIELD

The device and method disclosed in this document relates to three-dimensional object printing and, more particularly, to leveling systems in three-dimensional object printers.

BACKGROUND

Digital three-dimensional object manufacturing, also known as digital additive manufacturing, is a process of making a three-dimensional solid object of virtually any shape from a digital model. Three-dimensional object printing is an additive process in which one or more ejector heads deposit material to build up a part. Material is typically deposited in discrete quantities in a controlled manner to form layers which collectively form the part. The initial layer of material is deposited onto a substrate, and subsequent layers are deposited on top of previous layers. The substrate is supported on a platform that can be moved relative to the ejection heads so each layer can be printed; either the substrate is moved via operation of actuators operatively connected to the platform, or the ejector heads are moved via operation of actuators operatively connected to the ejector heads. Three-dimensional object printing is distinguishable from traditional object-forming techniques, which mostly rely on the removal of material from a work piece by a subtractive process, such as cutting or drilling.

In many three-dimensional object printing systems, a partially printed part is subjected to a leveling process after each layer of material is deposited. The leveling process ensures that each layer is a controlled thickness, and that the subsequent layer has a flat surface to be formed upon. By performing this leveling process between each successive layer, higher quality parts are manufactured within narrower tolerances.

In some three-dimensional object printing systems, a leveling roller flattens the upper surface of the part after each successive layer of material is deposited. FIG. 6 shows a prior art three-dimensional object printing system 100 having a conveyer 104 and a leveling roller 108. The conveyer 104 has a substantially planar surface 112 upon which printed parts, such as the partially formed part 116, are built. The conveyer 104 is configured to convey the part 116 in a conveying direction X that is parallel to the surface 112 of the conveyer 104. The roller 108 is arranged above the surface 112 of the conveyer 104 in a vertical direction Y that is normal to the surface 112 of the conveyer 104. The roller 108 is cylindrical about a longitudinal axis that extends in a lateral direction Z, which is parallel to the surface 112 of the conveyer 104 and orthogonal to the conveying direction X.

After each successive layer of material is deposited, the conveyer 104 conveys the part 116 in the conveying direction X. The roller 108 is adjusted to an appropriate distance from the surface 112 of the conveyer 104. The conveyer 104 feeds the part 116 between the conveyer 104 and the roller 108 to flatten an upper surface 120 of the part 116 that is opposite a bottom surface of the part 116 that sits upon the surface 112 of the conveyer 104.

The printing system 100 is designed to handle parts, such as the part 116, up to 20 inches wide in the lateral direction Z, but the roller 108 is intended to only remove about 3 microns of material from the upper surface 120 of the part 116. This constraint imposes costly manufacturing tolerances for the roller 108. For example, the roller 108 can be twenty inches long and two inches in diameter. This relatively large roller must be manufactured with tight tolerances for cylindricity. Particularly, the roller must be manufactured with tight tolerances for straightness and roundness. As used herein "straightness" refers to the variability of the roller's diameter across its length. As used herein "roundness" refers to the variability in diameter that depends on the angle from which the diameter measured. A roller with perfect roundness has precisely the same diameter when measured from all angles. Conversely, a roller having imperfect roundness has variances in diameter that depend on the angle from which it is measured. This variance in diameter at different angles is referred to as "run-out."

FIG. 7 shows a side view of the printing system 100 with a roller 108 having imperfect roundness, or run-out. A circular outline 204 shows an ideal roundness of the roller 108. As can be seen, portions of the roller 108 extend beyond the circular outline 204. The particular run-out of the roller 108 varies with each roller that is manufactured. Accordingly, the roller 108 is incapable of truly flattening the upper surface 120 of the part 116 unless the run-out of the roller is eliminated, but significant manufacturing costs must be incurred for the elimination of the run-out.

FIG. 8A and FIG. 8B show the effect of the run-out of the roller 108 on the leveling process. As the roller 108 moves over the upper surface 120 of the part 116, the longitudinal axis of the roller 108 maintains a fixed distance from the conveyer 104. However, because the diameter of the roller 108 varies, a ripple is produced in the upper surface 120 of the part 116 as the roller 108 moves across the part 116, as seen in FIG. 8B. Accordingly, the run-out of the roller 108 adversely impacts the leveling process.

In current printing systems, such as the printing system 100, the rollers 108 are ground to very tight tolerances on the order of one micron to minimize the effect of the run-out. The roller 108 can be manufactured at reasonable costs within one micron of variability in its straightness. However, manufacturing the roller 108 with tighter tolerances for roundness comes at great expense. What is needed is a low cost leveling assembly that can accurately flatten the upper surface of a part as the part is formed without requiring a large roller manufactured within such tight tolerances for roundness.

SUMMARY

A three-dimensional object printing system is disclosed. The three-dimensional object printing system comprises a conveyor having a planar surface configured to convey a three-dimensional object in a first direction, the first direction being parallel to the planar surface; and a leveling assembly arranged along the conveyer and configured to level a surface of the three-dimensional object as the conveyer conveys the three-dimensional object in the first direction. The leveling assembly comprises a roller having a cylindrical shape about a longitudinal axis and arranged in the second direction with respect to the planar surface of the conveyer, the roller being configured to rotate about the longitudinal axis, the longitudinal axis being parallel to the planar surface of the conveyer and perpendicular to the first direction, the roller having an outer surface that moves upon the surface of the three-dimensional object to level the surface of the three-dimensional object; and a guide device arranged between the roller and the planar surface of the conveyer, the device being configured to interact mechanically with the roller to maintain a constant distance between the outer surface of the roller and the planar surface of the conveyer.

A leveling assembly is disclosed for retrofitting a three-dimensional object printer having a conveyor having a planar surface configured to convey a three-dimensional object in a first direction, the first direction being parallel to the planar surface, and a roller arranged along the conveyor and configured to level a surface of the three-dimensional object as the conveyer conveys the three-dimensional object in the first direction, the roller having a first end and a second end and a cylindrical shape about a longitudinal axis that is perpendicular to the first direction and parallel to the planar surface of the conveyer, the roller having an outer surface that moves upon the surface of the three-dimensional object to level the surface of the three-dimensional object as the object moves in the first direction. The leveling assembly for retrofitting a three-dimensional object printer comprises a guide device configured to be arranged between the roller and the planar surface of the conveyer, the device being configured to interact mechanically with the roller to maintain a constant distance between the outer surface of the roller and the planar surface of the conveyer; and an actuator operatively connected to the guide device, the actuator being configured to adjust a distance between an upper surface of the guide device and the planar surface to position the guide device for removal of a portion from the surface of the three-dimensional object.

BRIEF DESCRIPTION OF THE DRAWINGS

The foregoing aspects and other features of the method and device are explained in the following description, taken in connection with the accompanying drawings.

DETAILED DESCRIPTION

Figure 1:
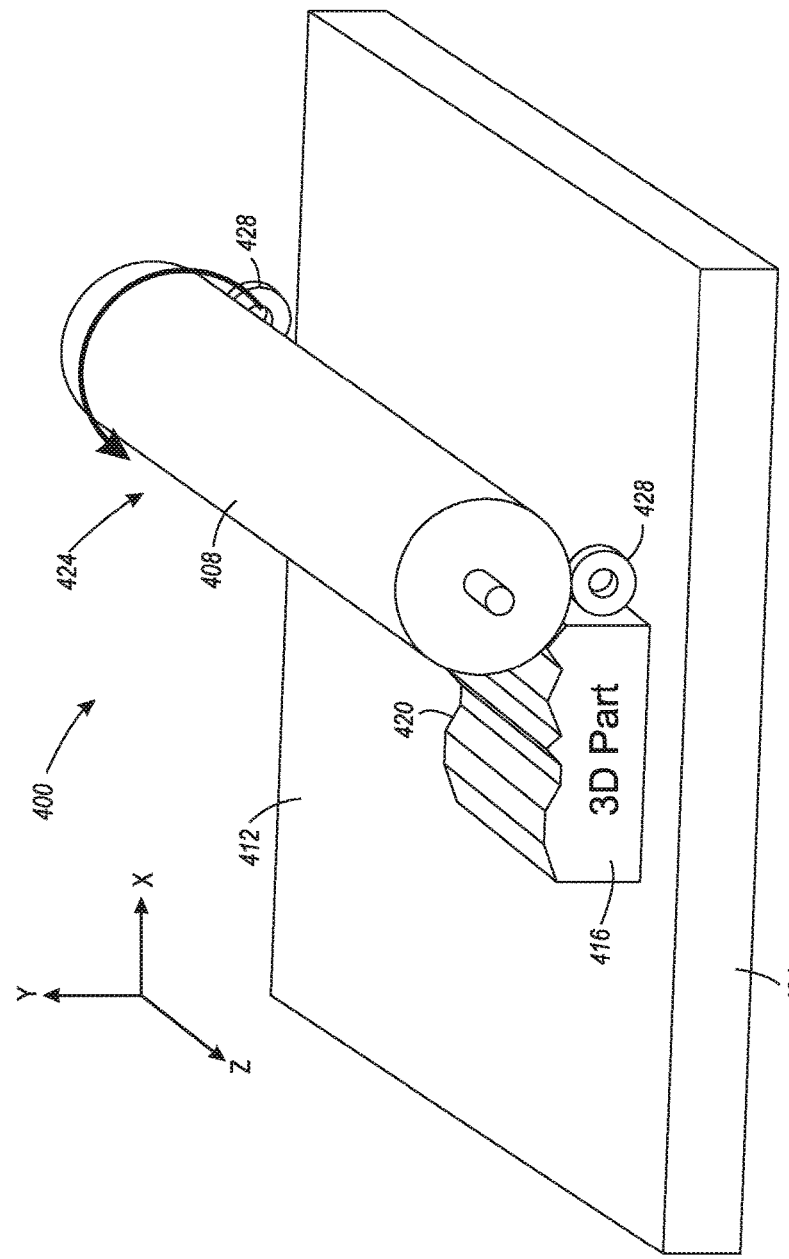
FIG. 1 shows a three-dimensional object printing system having a leveling assembly according to the disclosure.

For a general understanding of the environment for the three-dimensional object printing system disclosed herein as well as the details for the three-dimensional object printing system, reference is made to the drawings. In the drawings, like reference numerals designate like elements.

FIG. 1 shows a three-dimensional object printing system 400 according to the disclosure. Similar to the printing system 100, the printing system 400 includes a conveyer 404 having a substantially planar surface 412 upon which printed parts, such as the part 416 are placed. The conveyer 404 is configured to convey the part 416 in the conveying direction X, which is parallel to the surface 412 of the conveyer 404.

However, the printing system 400 differs from the system 100 because it includes a leveling assembly 424. The leveling assembly 424 includes a leveling roller 408 and at least one guide device. The roller 408 is similar to the roller 108 of the printing system 100. The roller 408 is arranged above the surface 412 of the conveyer 404 in the vertical direction Y, which is normal to the surface 412 of the conveyer 404. The roller 408 is generally cylindrical about a longitudinal axis that extends in the lateral direction Z, which is parallel to the surface 412 of the conveyer 404 and orthogonal to the conveying direction X. In one embodiment, the roller 408 is manufactured within one micron of variability in its straightness. However, the roller 408 has imperfect roundness that results in run-out, as described above with respect to the roller 108.

The leveling assembly 424 is designed to compensate for the imperfect roundness of the roller 408 without incurring the substantial costs of correcting the run-out in each roller 408. The guide device is arranged between the roller 408 and the surface 412 of the conveyer 404. The guide device is configured to interact mechanically with the roller 408 to maintain a constant distance between the outer surface of the roller 408 and the surface 412 of the conveyer 404. As shown in FIG. 1, the guide device comprises a pair of precision bearings 428. The bearings 428 have an outer surface that abuts a portion of the outer surface of the roller 408 that is closest to the surface 412 of the conveyer 404. The bearings 428 are held at a particular distance from the surface 412 of the conveyer 404 so the outer surface of the roller 408 is kept at a constant distance from the surface 412 of the conveyer 404. As the roller 408 rotates about its longitudinal axis on the bearings 428, the run out in the roller 408 pushes the roller away from the conveyer 404 when the diameter of the roller increases in the vertical Y direction and moves towards the conveyor when the diameter of the roller decreases in the vertical direction Y.

Figure 2:
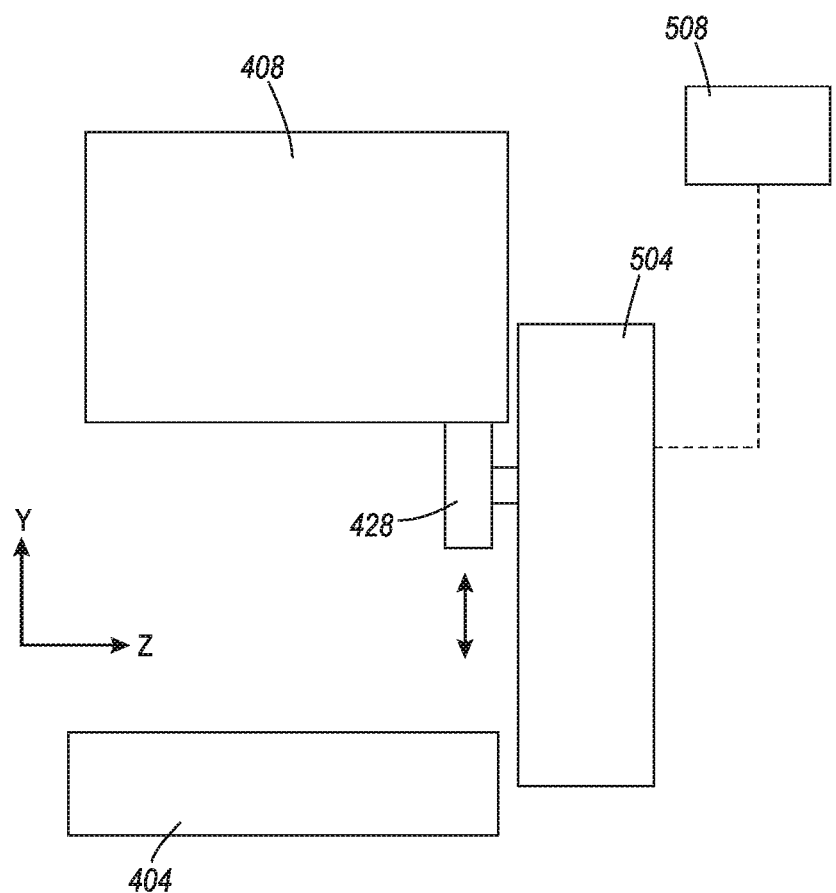
FIG. 2 shows a controller and actuator for positioning a bearing of the leveling assembly.

In some embodiments, the leveling assembly 424 further comprises at least one actuator connected to the bearings 428 and the actuator is configured to move the bearings 428 in the vertical direction Y to adjust the distance maintained between the outer surface of the roller 408 and the surface 412 of the conveyer 404. FIG. 2 shows one embodiment of an actuator 504 that is paired with one of the bearings 428. The actuator 504 is configured to move the bearing 428 up and down in the vertical direction Y to adjust the distance between the outer surface of the roller 408 and the surface 412 of the conveyer 404. A similar actuator 504 (not shown) is paired with the other of the bearings 428 on the opposite side of the conveyer 404.

In one embodiment, the printing system 400 further comprises a controller 508. The controller 508 is configured to operate the actuator 504 to adjust the distance between the outer surface of the roller 408 and the surface 412 of the conveyer 404. In some embodiments, the controller 508 is configured, after each layer of the part 416 is formed, to operate the actuator 504 to increase the distance between the outer surface of the roller 408 and the surface 412 of the conveyer 404. In some embodiments, the controller 508 is further configured, as required, to operate the actuator 504 to adjust the distance between the outer surface of the roller 408 and the surface 412 of the conveyer 404 to be sufficiently large to enable the part 416 to pass underneath the roller 408 without making contact with the roller 408. In some embodiments, the controller 508 is also configured to operate other parts of the printing system 400, such as the conveyer 404 or an ejector head that forms the layers of the part 416. In other embodiments, the controller 508 is a separate controller for the leveling assembly 424.

Figure 3:
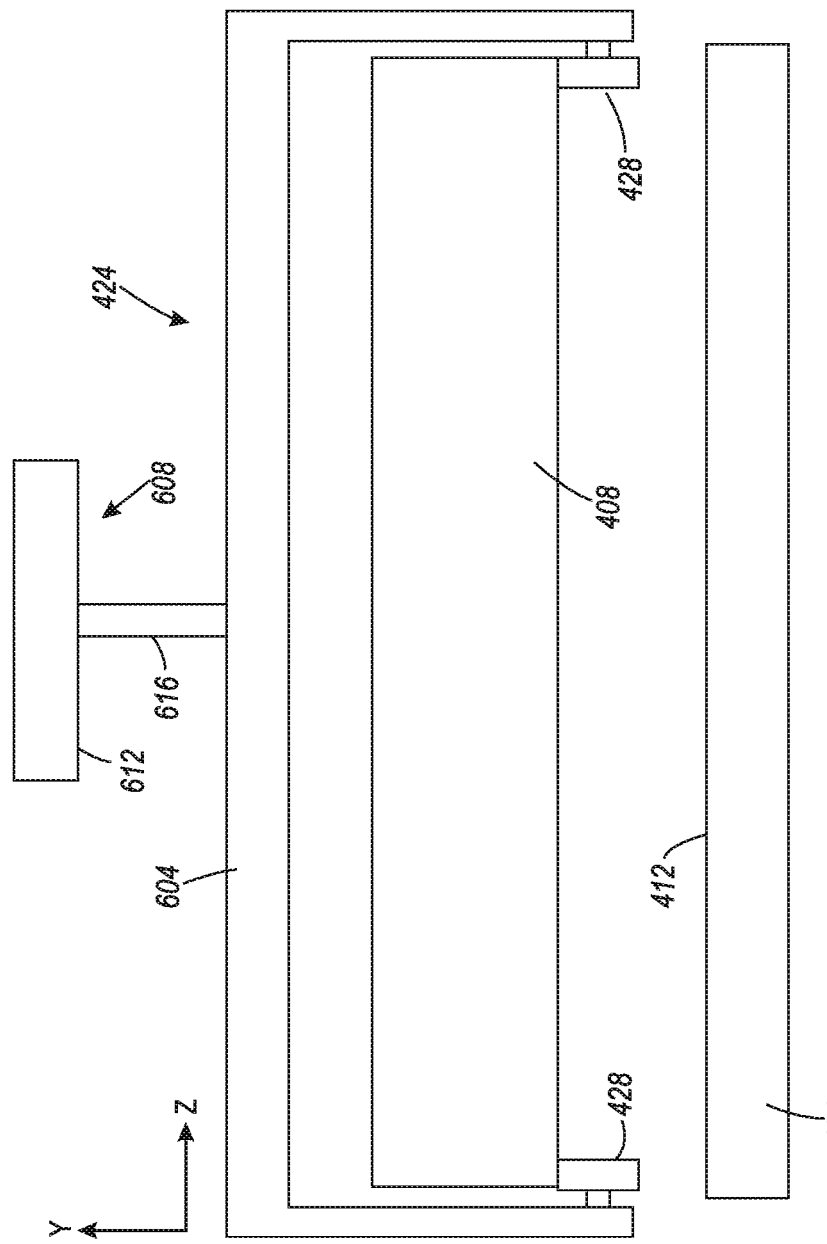
FIG. 3 shows an alternative embodiment having a member that attaches to both bearings.

FIG. 3 shows an alternative embodiment in which the bearings 428 of the leveling assembly 424 are each attached to a U-shaped member 604. The member 604 is configured to keep the bearings 428 aligned with one another and is operated by actuator 608 to move the bearings 428. The actuator 608 operates to move the member 604 and the roller bearings 428 up and down in the vertical direction Y. In one embodiment, the actuator comprises a drive 612 that operates a lead screw 616. The lead screw 616 is operably connected to the member 604 such that rotations of the lead screw 616 cause the member 604 to move up or down in the vertical direction Y. The controller 508 is configured to operate the actuator 1032 in the same way described with respect to the previous embodiments.

Figure 4:
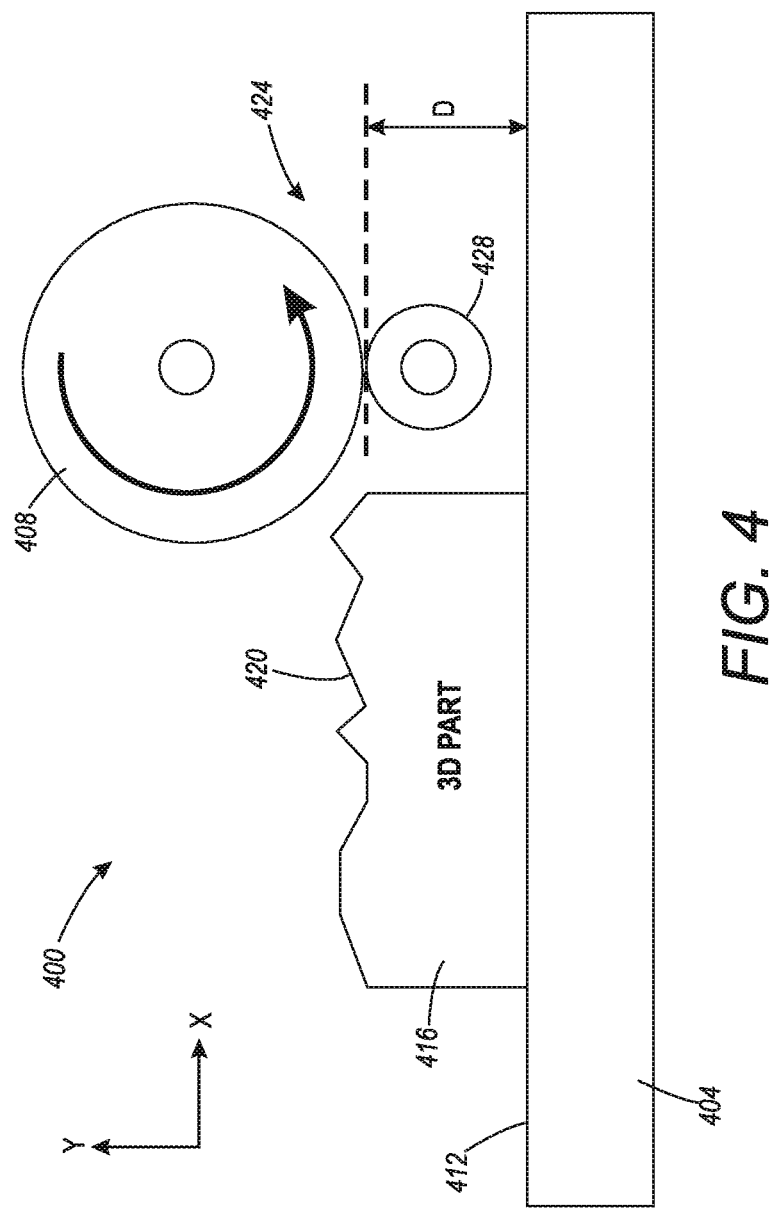
FIG. 4 shows a side view of the printing system of FIG. 1.
Figure 5A:
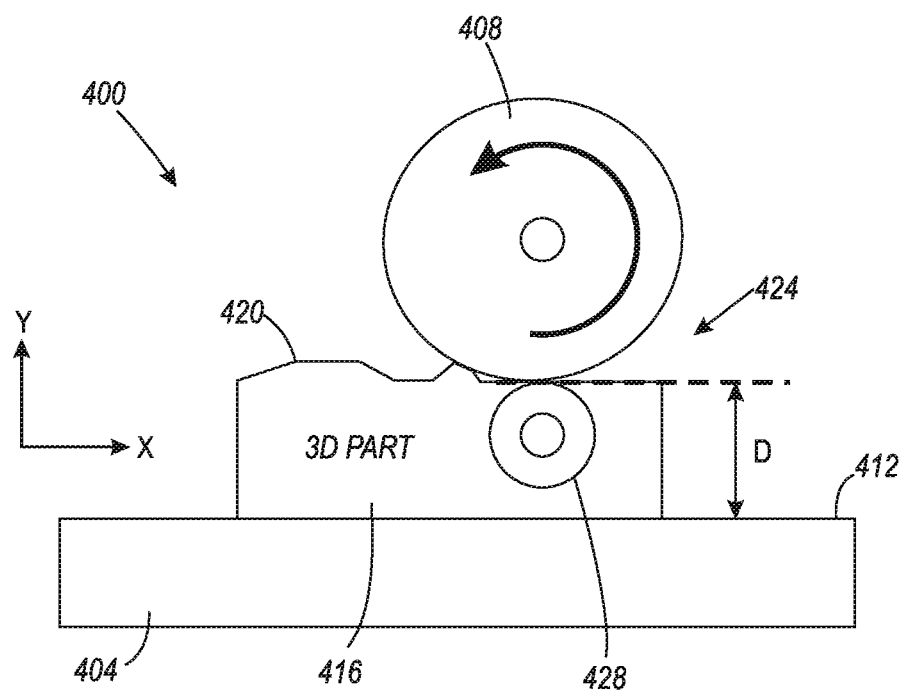
FIGS. 5A and 5B depict the operation of the leveling assembly.
Figure 5B:
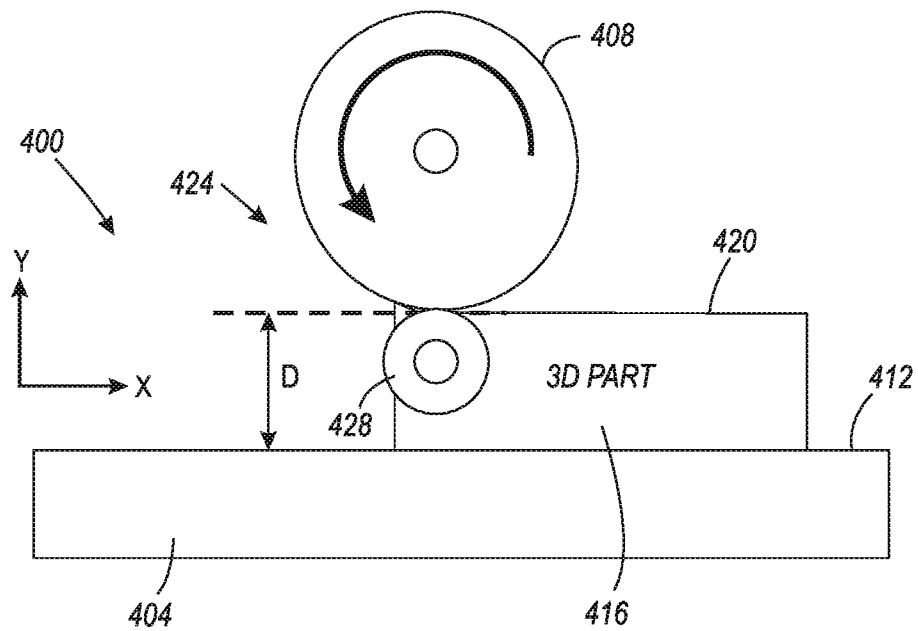
Figure 6:
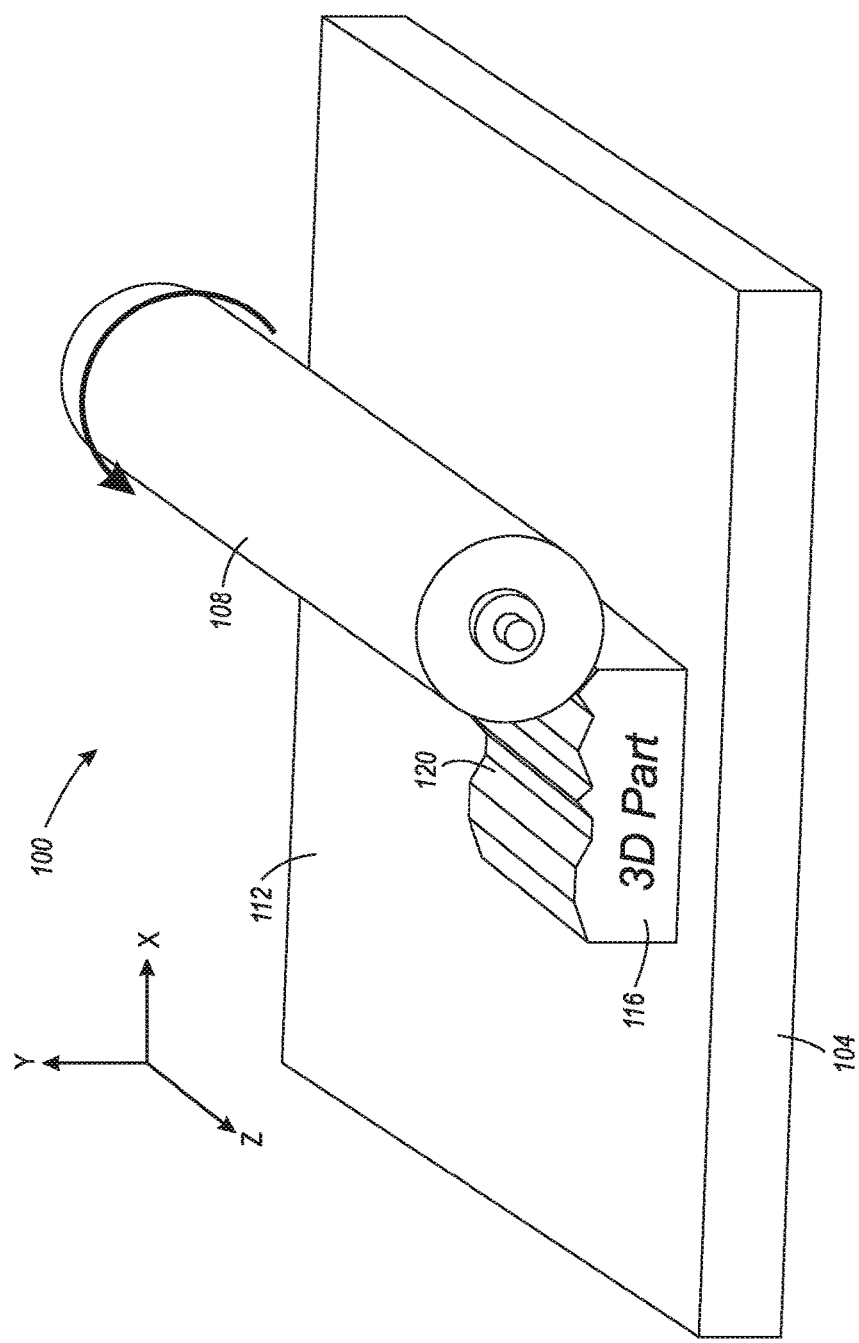
FIG. 6 shows perspective view of a prior art three-dimensional object printing system.
Figure 7:
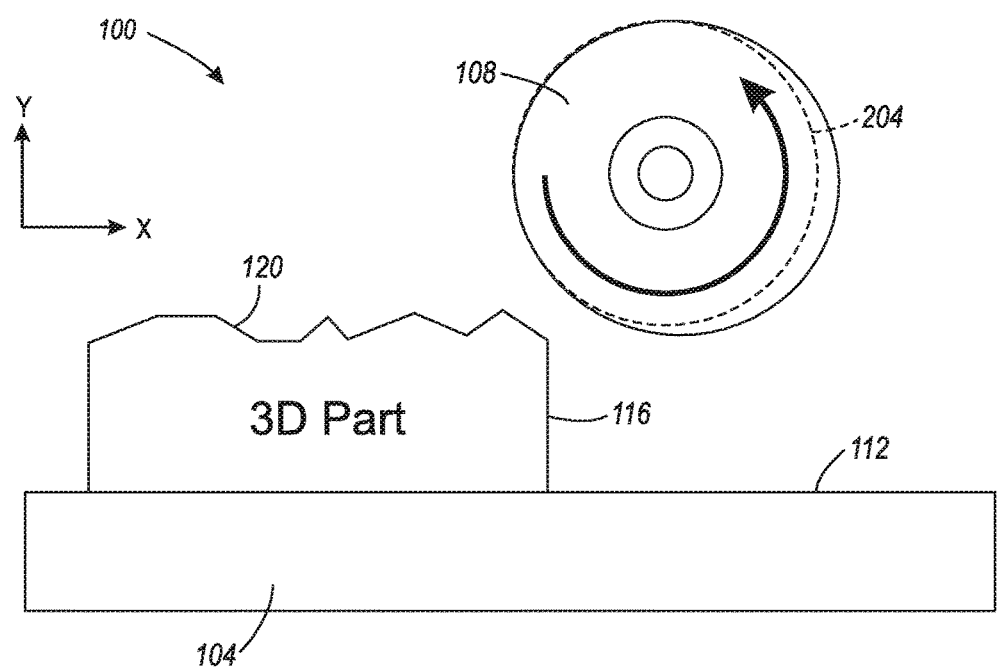
FIG. 7 shows a side view of the prior art printing system of FIG. 6.
Figure 8A:
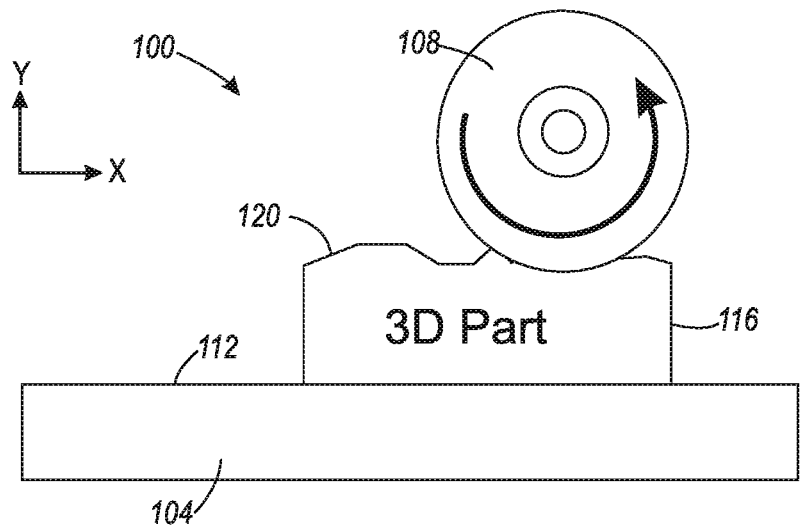
FIGS. 8A and 8B depict the ripple effect caused by run-out in the roller of the leveling assembly in the prior art printing system of FIG. 6.
Figure 8B:
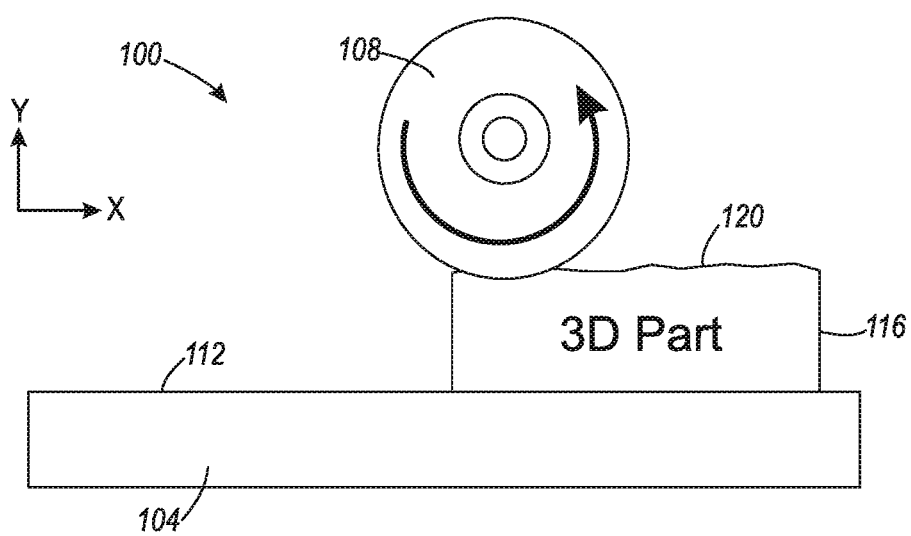

FIG. 4 shows a side view of the printing system 400. As shown, the bearing 428 abuts the roller 408 at a point on the outer surface of the roller 408 that is closest to the surface 412 of the conveyer. The bearing 428 is held in place by the actuator 504 such that a distance D is maintained between the outer surface of the roller 408 and the surface 412 of the conveyer 404. As shown in FIG. 5A and FIG. 5B, the outer surface of the roller 408 moves upon the upper surface 420 of the part 416 as the conveyer 404 feeds the part 416 in the conveying direction X. As the roller 408 rotates, the bearing 428 also rotates and enables the run-out in the roller 408 to move the roller away from and towards the surface 412 of the conveyer 404 in the vertical direction Y depending on the increase and decrease in the diameter of the roller, respectively. In this way, the distance D between the outer surface of the roller 408 and the surface 412 of the conveyer 404 remains constant, regardless of the rotational position of the roller 408. As a result, the leveling assembly 424 flattens the surface 420 of the part 416 without the rippling effect that would otherwise be caused by the run-out in the roller 408.

It will be appreciated that variants of the above-disclosed and other features and functions, or alternatives thereof, may be desirably combined into many other different systems, applications or methods. Various presently unforeseen or unanticipated alternatives, modifications, variations, or improvements therein may be subsequently made by those skilled in the art, which are also intended to be encompassed by the following claims.

What is claimed is:

1. A three-dimensional object printer comprising:
a conveyor having a planar surface configured to convey a three-dimensional object in a first direction, the first direction being parallel to the planar surface; and
a leveling assembly arranged along the conveyer and configured to level a surface of the three-dimensional object as the conveyer conveys the three-dimensional object in the first direction, the leveling assembly comprising:
a roller having a cylindrical shape about a longitudinal axis and arranged in a second direction with respect to the planar surface of the conveyer, the roller being configured to rotate about the longitudinal axis, the longitudinal axis being parallel to the planar surface of the conveyer and perpendicular to the first direction, the roller having an outer surface that moves upon the surface of the three-dimensional object to level the surface of the three-dimensional object;
a guide device arranged between the roller and the planar surface of the conveyer, the guide device being configured with a bearing, the bearing having a rotational axis that is parallel with the longitudinal axis of the roller, the bearing having an outer surface that moves against the outer surface of the roller as the roller rotates to interact mechanically with the roller to maintain a constant distance between the outer surface of the roller and the planar surface of the conveyer;
an actuator configured to move the bearing in the second direction with respect to the surface of the conveyer to adjust the maintained constant distance between the outer surface of the roller and the planar surface of the conveyer; and
a controller operably connected to the actuator, the controller being configured to operate the actuator to move the bearing a predefined distance from the planar surface of the conveyer such that the three-dimensional object passes between the planar surface of the conveyer and the roller without making contact with the roller.

2. The three-dimensional object printer of claim 1, the bearing comprising:
a first bearing and a second bearing, the first bearing being arranged at a first end of the roller, the second bearing being arranged at a second end of the roller.

3. The three-dimensional object printer of claim 2, the guide device further comprising:
a member connected to the first bearing and connected to the second bearing, the member being configured to keep the first bearing in alignment with the second bearing.

4. A leveling assembly for retrofitting a three-dimensional object printer having (i) a conveyor having a planar surface configured to convey a three-dimensional object in a first direction, the first direction being parallel to the planar surface, and (ii) a roller arranged along the conveyer and configured to level a surface of the three-dimensional object as the conveyer conveys the three-dimensional object in the first direction, the roller having a first end and a second end and a cylindrical shape about a longitudinal axis that is perpendicular to the first direction and parallel to the planar surface of the conveyer, the roller having an outer surface that moves upon the surface of the three-dimensional object to level the surface of the three-dimensional object as the object moves in the first direction, the leveling assembly comprising:
a guide device configured to be arranged between the roller and the planar surface of the conveyer, the guide device being configured with a bearing, the bearing having a rotational axis that is parallel with the longitudinal axis of the roller, the bearing having an outer surface that moves against the outer surface of the roller as the roller rotates to interact mechanically with the roller to maintain a constant distance between the outer surface of the roller and the planar surface of the conveyer;
an actuator operatively connected to the bearing of the guide device, the actuator being configured to move the bearing in a second direction with respect to the surface of the conveyer to adjust a distance between an upper surface of the bearing of the guide device and the planar surface of the conveyor to position the roller for removal of a portion from the surface of the three-dimensional object; and
a controller operably connected to the actuator, the controller being configured to operate the actuator to move the bearing a predefined distance from the planar surface of the conveyer such that the three-dimensional object passes between the planar surface of the conveyer and the roller without making contact with the roller.

5. The leveling assembly of claim 4, the bearing comprising:
   a first bearing and a second bearing, the first bearing being arranged at a first end of the roller, the second bearing being arranged at a second end of the roller.

6. The leveling assembly of claim 5, the guide device further comprising:
   a member connected to the first bearing and connected to the second bearing, the member being configured to keep the first bearing in alignment with the second bearing.

* * * * *